June 29, 1948.    H. G. BUSIGNIES    2,444,031
ELECTROMAGNETIC WAVE OBSTACLE DETECTION SYSTEM
Filed March 8, 1941
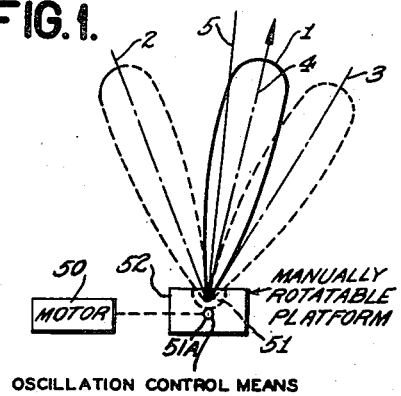
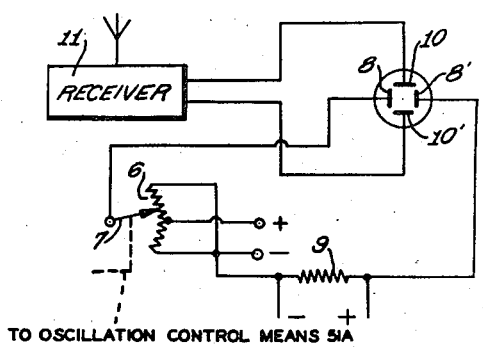
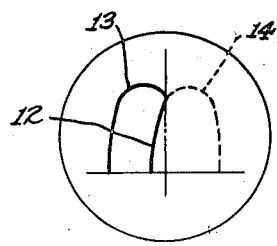   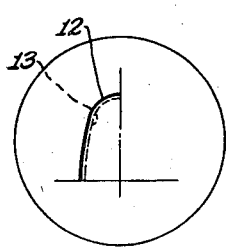   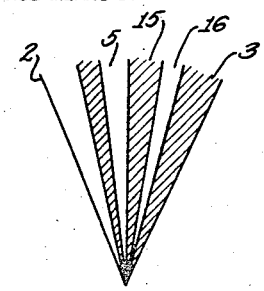
FIG.3.   FIG.4.   FIG 5
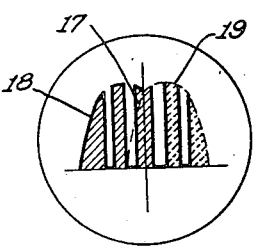   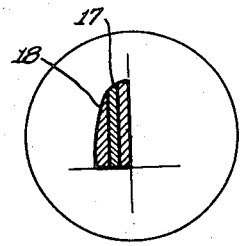
FIG.6.   FIG.7.
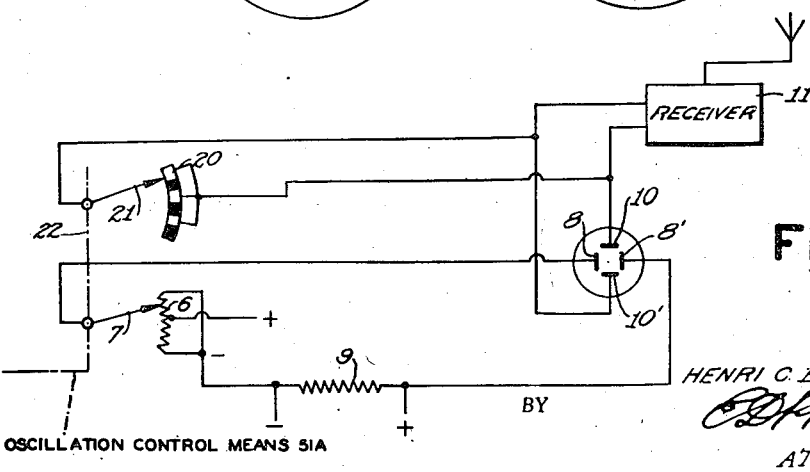
FIG.8.
INVENTOR.
HENRI C. BUSIGNIES
BY
ATTORNEY.

Patented June 29, 1948

2,444,031

UNITED STATES PATENT OFFICE 2,444,031

ELECTROMAGNETIC WAVE OBSTACLE DETECTION SYSTEM

Henri G. Busignies, Forest Hills, N. Y., assignor to International Standard Electric Corporation, New York, N. Y., a corporation of Delaware Application March 8, 1941, Serial No. 382,392

3 Claims. (Cl. 343—16)

1

The present invention relates to systems for the detection of obstacles, such as movable objects, airplanes or other objects, that make use of certain properties possessed particularly by electromagnetic waves.

One of the objects of the invention is the providing of obstacle detection systems that use a directional electromagnetic radiation in such a way as to be able to obtain an indication of the direction of a movable object sought for, while continuing to provide supervision in a greater region of space than that covered by the directional radiation itself.

Another object of the invention is the providing of obstacle detection systems of this kind that permit the obtaining of precise indications of the lay without being specially obliged to comply with strict conditions of narrowness of the directional radiation.

In order to increase the precision of readings on the indicator that is used, e. g. a cathode ray oscillograph, one characteristic feature of the invention provides for the replacement of devices in which the reading is given by the crossing of two diagrams or the displacement of a particular point on a curve by devices in which the indication is obtained by the mechanical displacement of a member until two contours coincide or until two curves, e. g. two curves representing series of impulses are superposed in such a way that the hollow parts of one coincide with the full parts of the other.

An obstacle detection system that incorporates features of the invention comprises means for giving a predetermined displacement in space to a diagram of directional radiation, and means for controlling this indicator as well according to modifications that this diagram of radiation undergoes as a result of the presence of a movable object.

More specifically and according to certain of its features, the invention provides means for emitting radiation diagram the axis of which oscillates by a predetermined angle around a given position, means for receiving the returned energy reflected by an obstacle such as a movable object, and means for controlling an indicating device, e. g. a cathode ray oscillograph as function of the oscillation of the axis of the diagram and of the return energy received. The time of the scanning in one direction on the said oscillograph may, for example, be controlled as a direct function of the oscillation of the axis of the diagram, and symmetrically with respect to the mid-position of oscillation, while the

2 scanning in the other direction is controlled by the return energy received. On the screen of the oscillograph there will appear two curves which will be brought into coincidence by orientating the mid position of the oscillation, i. e., by effectively orientating the entire emitting unit. The orientation of the said mid position in which the two curves coincide on the screen of the oscillograph gives the position of the obstacle which reflects the directionally radiated energy. Since this radiation pattern however continues to oscillate while scanning a certain angle in space, other indications of the presence of obstacles may accordingly be obtained during this searching; in other words, the system provides at the same time for the exact determination of the position of an obstacle as well as for the supervision of a relatively wide region of space.

According to other features of the invention, a finer degree of precision of the indications obtained with the above system can also be effected by controlling the setting in and out of operation of the receiving means according to a predetermined code and in a supplementary way on each side of the mid position of oscillation of the directional pattern. The two indications produced on the oscillograph will then consist of two series of curves whose envelopes are the curves produced in the first system. The indication of position will then be given when these two series of curves become complementary, i. e. when they join together complementarily so as to furnish a curve that reproduces the single curve of the first system.

The invention is described in detail in the following description with reference to the appended drawings, in which:

Fig. 1 illustrates the apparatus for scanning space, used in the present invention;

Fig. 2 is a schematic view of one example of a cathode ray oscillograph according to certain features of the invention;

Fig. 3 illustrates one example of indications obtained on a cathode ray oscillograph screen in a system incorporating features of the invention when the mid position of the transmitter oscillation does not coincide with the direction of the obstacle;

Fig. 4 shows the indication giving the direction of the obstacle;

Fig. 5 illustrates the virtual splitting-up at the receiving end of a radiation diagram in a system incorporating features of the invention;

Figs. 6 and 7 show the indications produced on a cathode ray oscillograph screen with the circuit of Fig. 8; and Fig. 8 illustrates a modification of Fig. 2 for effecting at the receiving end the virtual subdivision of the radiation diagram as shown in Fig. 5.

A system for the detection of obstacles, e. g. airplanes, that incorporates characteristic features of the invention makes uses of a radio-electric transmitter-receiver assembly of any type suitable for obstacle detection. The radiation diagram is controlled so as to oscillate by a predetermined angle, e. g. at least the radiating element is mounted on a platform which may be given a mechanical oscillatory movement of a relatively long period, e. g. one second. This movement may for example be controlled by motor 50 driving antenna 51 through oscillation control means 51A. This radiating element is directive to such an extent as to produce a directional radiation diagram like that shown as an example at 1 in Fig. 1. In this figure, 2 and 3 designate the limits of oscillation of axis 4 of the radiation diagram, and 5 designates the bisector of the angle of the directions 2 and 3, i. e. the mid position of the axis of the continuous oscillation diagram. The entire radiating unit 51, including the oscillating platform, may be carried by a second platform 52 which can be orientated by hand or by a manually driven control so as to permit any desired adjustment of the direction in space of the mid position 5 of the axis of diagram 1.

The scanning of a cathode ray oscillograph in one direction is controlled by voltages that vary as function of the oscillation of the radiation diagram 1 symmetrically around its mid position 5, for example, as shown schematically in Fig. 2, by means of a potentiometer 6 whose movable contact or slider 7 is carried along in the mechanical oscillatory movement of the radiation diagram 1. It is evident that inversely it is the contact that may be stationary, and potentiometer's resistance that may oscillate. In order that the scanning voltages may vary symmetrically with respect to the mid position 5, this potentiometer 6 is fed with positive potential at its mid point, its two ends being connected, as shown, to the negative pole of the source of feed (not shown). One end of potentiometer 6 and the slider 7 are respectively connected to a pair of cathode ray oscillograph scanning plates 8—8'.

A counter E. M. F. shown as a reverse voltage applied to the terminals of a resistance 9 is inserted in a connection, e. g. that of potentiometer 6, to plate 8' so as to produce a scanning that starts for example, from the left-hand side of the screen, and not from its middle.

The signals issuing from receiver 11 are to be applied to the other pair of the oscillograph's scanning plates 10—10'. This receiver 11 will receive the energy of diagram 1 refleceted by the movable object to be detected.

On the screen of the oscillograph there appears an indication like that shown in heavy lines at 12—13 in Fig. 3. The curve 13 results from the special potentiometer arrangement that is provided. Indeed, the above mentioned connections of potentiometer 6 insure the application to plates 8—8' of voltages that become reversed when slider 7 passes the mid point of the potentiometer. The moment when slider 7 passes over the mid point of potentiometer 6 corresponds to the moment when the axis of diagram 1 coincides with the mid position 5 during the oscillation. If this reversal were not effected, e. g. by the illustrated potentiometer arrangement, curve 13 would be in the position shown in dotted line at 14, i. e. would be a prolongation of curve 12.

The platform on which the oscillatory system is mounted is then orientated either manually or by a controlled drive until the two curves 12 and 13 coincide on the screen of the oscillograph, as shown in Fig. 4. The orientation of the platform will then give with precision the directional position of the detected movable object owing to the fact that the mid position 5 of the oscillation of the radiation diagram will then coincide with the direction for spotting the movable object. The detected movable object can even be followed by manipulating the orientable platform in such a way as to keep the two curves 12 and 13 in coincidence on the screen of the oscillograph.

While thus permitting spotting of the position of a movable object with relatively great precision without the beam having to be particularly narrow and thus easier to produce, it can be seen that, if another movable object comes into the region comprised within the angle of oscillation of the radiation diagram, another indication will appear simultaneously on the screen of the oscillograph and will thus detect the presence of this other movable object and consequently insure supervision of the region of space comprised between the limits of the radiated diagram.

The superposition of two curves on an oscillograph screen like that just described furnishes an exact indication of the position of the detected movable object. However, according to other features of the invention, still greater precision may be attained in the way explained for Figs. 5, 6, and 7. By creating in space zones of radiation and non-radiation (indicated by 15 and 16 in Fig. 5) within the oscillation limits 2 and 3 of the emitted radiation diagram, the received signals will undergo the same variations and, e. g. with the arrangement shown in Fig. 2, there will now be obtained on the screen of the oscillograph, not two continuous curves 12 and 13 but two curves comprising a succession of peaks like those shown at 17 and 18 in Fig. 6. As envelope, each of these curves has respectively curves 12 and 13 of Fig. 3. Curve 18 is the symmetric of curve 19 indicated in dotted line and it would coincide with curve 17 if reversal of the voltages of potentiometer 6 has not been effected.

According to one of its features, the invention provides for splitting up the space comprised between the limits 2 and 3 into effective zones of radiation and of non-radiation 15 and 16 that are complementary with respect to the axis 5 of mid position of the axis of the radiation diagram. Curves 17 and 18 will then reproduce this complementary arrangement and, when the platform that carries the radiating unit is manipulated in such a way that the axis 5 is brought into coincidence with the direction of the detected movable object, the two curves 17 and 18 will come into coincidence in the manner shown in Fig. 7 so as to reconstitute the complete envelope curve. It is evident that greater precision will be obtained in this way owing to the fact that it will be easier to see the staggering between the various envelope portions in the reconstruction of a single curve than by the superposition on the screen on two curves of a certain thickness.

According to another feature of the invention, such a splitting up of the space may be effected in a simple manner by making it virtual, i. e. at the receiving end only. The emitted diagram will be identical with that of the first-described system, but simple means permit blocking of the receiver according to a predetermined code during the period of oscillation of the radiation diagram. The energy issuing from the receiver will be modulated according to this code and will control scanning of the oscillograph by giving to the indications the division shown in Figs. 6 and 7. Such means may consist, for example and as shown in Fig. 8, of a bank of spaced contacts 20, which are disposed complementarily on each side of the axis of the bank, and on this bank there slides a rubbing contact 21 driven in synchronism with slider 7, as indicated by the mechanical coupling shown in dotted line at 22, i. e. in synchronism with the oscillatory movement of the radiation diagram. By the axis of the bank is meant that point thereof which is swept by brush 21 in synchronism with the passage of the emitted radiation pattern through its axis 5 and with the passage of brush 7 through the + feed point of potentiometer 6.

It is to be observed that the oscillatory movement of the radiation diagram may be either mechanical as shown, or else electrical, e. g. by commutation of reflecting elements. In this latter case, the electrical commutation means should be disposed so as to also control displacements of the slider 7 and the rubbing contact 21.

It must likewise be understood that the described method of oscillograph scanning and the means of control (potentiometers, banks of contacts) are only given as examples.

Further modifications and adaptations of the invention can be made without departing from its scope.

What is claimed is:

1. A radio position finding system of the type comprising transmitting means for producing a transmitted energy pattern continuously oscillating between two fixed angular positions, on opposite sides of a mean angular position, receiving means for non-directively receiving energy so transmitted after reflection from an obstacle, and an oscillograph indicator having a screen and means for producing an electron beam, means for deflecting said beam across said screen along two perpendicular axes, characterized by the provision of scanning means for deflecting said beam back and forth along one of said axes in synchronism with the movement of said transmitted energy pattern from one of said fixed angular positions past said mean position to the other of said fixed angular positions, means for deflecting said beam along the other of said axes in response to the reflected energy received by said receiving means, and means for adjusting said mean angular position of said transmitted energy pattern whereby two similarly shaped patterns are produced upon said screen in substantially superposed position in response to alignment of said mean position with a reflecting obstacle.

2. A radio position finding sytsem, according to claim 1, further comprising means operated in synchronism with said scanning means for dividing said received signals into complementary patterns.

3. A radio position finding system of the type comprising transmitting means for producing a transmitted energy pattern continuously oscillating between two fixed angular positions, on opposite sides of a mean angular positon, receiving means for non-directively receiving energy so transmitted after reflection from an obstacle, and an oscillograph indicator having a screen and means for producing an electron beam, and means for deflecting said electron beam across said screen along two perpendicular axes, characterized by the provision of scanning means for deflecting said beam back and forth along one of said axes in a multiple integer relationship with the oscillation movement of said transmitted energy pattern from one of said fixed angular positions past said mean position to the other of said fixed angular positions, means for deflecting said beam along the other of said axes in response to the reflected energy received by said receiving means, and means for adjusting said mean angular position of said transmitted energy pattern whereby two similarly shaped patterns are produced upon said screen in substantially superposed position in response to alignment of said mean position with a reflecting obstacle.

HENRI G. BUSIGNIES.

REFERENCES CITED

The following references are of record in the file of this patent:

UNITED STATES PATENTS

| Number | Name | Date |
|---|---|---|
| 2,112,283 | Fritz | Mar. 29, 1938 |
| 2,212,110 | Beuerman | Aug. 20, 1940 |
| 2,237,604 | Marique | Apr. 8, 1941 |

FOREIGN PATENTS

| Number | Country | Date |
|---|---|---|
| 497,147 | Great Britain | Dec. 9, 1938 |
| 108,556 | Australia | Sept 14, 1939 |

OTHER REFERENCES

Wireless World, June 26, 1936, pp. 623, 624.